US006675345B1

United States Patent
Brown et al.

(10) Patent No.: US 6,675,345 B1
(45) Date of Patent: Jan. 6, 2004

(54) METHOD AND APPARATUS FOR DETECTING ERRORS IN DVD DATA

(75) Inventors: Christopher T. Brown, Sunnyvale, CA (US); Tina Peng, San Jose, CA (US); Sheena F. Shi, Sunnyvale, CA (US); Arup K. Bhattacharya, Lake Forest, CA (US)

(73) Assignee: Oak Technology, Inc., Sunnyvale, CA (US)

( * ) Notice: Subject to any disclaimer, the term of this patent is extended or adjusted under 35 U.S.C. 154(b) by 0 days.

(21) Appl. No.: 09/569,676

(22) Filed: May 12, 2000

(51) Int. Cl.[7] .......................... G11C 29/00; G06F 11/00
(52) U.S. Cl. ........................ 714/763; 714/704; 714/718
(58) Field of Search ................................. 714/763, 800, 714/801, 805, 855, 751, 752, 753, 704, 52, 758, 718, 719

(56) References Cited

U.S. PATENT DOCUMENTS

| | | | | |
|---|---|---|---|---|
| 4,617,664 A | * | 10/1986 | Aichelmann et al. | 714/758 |
| 4,969,139 A | * | 11/1990 | Azumatani et al. | 369/53.16 |
| 5,392,299 A | * | 2/1995 | Rhines et al. | 714/756 |
| 6,092,231 A | * | 7/2000 | Sze | 714/758 |
| 6,321,351 B1 | * | 11/2001 | Brown et al. | 714/704 |
| 6,470,473 B1 | * | 10/2002 | Iwasa | 714/785 |

* cited by examiner

Primary Examiner—Christine T. Tu
(74) Attorney, Agent, or Firm—John F. Schipper

(57) ABSTRACT

A method and apparatus for processing data read from a DVD media containing stored data is described. The apparatus includes a DVD media reader for reading data and error information stored on a DVD media, an error processor for determining the number of errors in the read data, and a display means for displaying the number of errors. The method includes reading actual data from a DVD media, computing a first correction code for the actual data, reading a second correction code from the DVD media, the second correction code pertaining directly to said stored data, and comparing the first and second correction codes to determine whether said actual data needs to be corrected. The method further includes determining whether the number of errors in the actual data exceeds the maximum number of errors that can be corrected, correcting the actual data if possible, counting the number of errors that are corrected, and indicating if errors in a given row or column cannot be corrected.

24 Claims, 8 Drawing Sheets

| BIT 6 | BIT 5 | BIT 4 | BIT 3 | BIT 2 | BIT 1 | BIT 0 |
|---|---|---|---|---|---|---|
| RESERVED | UNCORRECTED | C4 | C3 | C2 | C1 | C0 |

*Fig. 4A*

| BIT 26 | BIT 25 | BIT 24 | BIT 23 | BIT 22 | BIT 21 | BIT 20 | BIT 19 | BIT 18-1 | BIT 0 |
|---|---|---|---|---|---|---|---|---|---|
| RESERVED | UNCORRECTED | C4 | C3 | C2 | C1 | C0 | BLOCK ID (MSB) | BLOCK ID | BLOCK ID (LSB) |

*Fig. 4B*

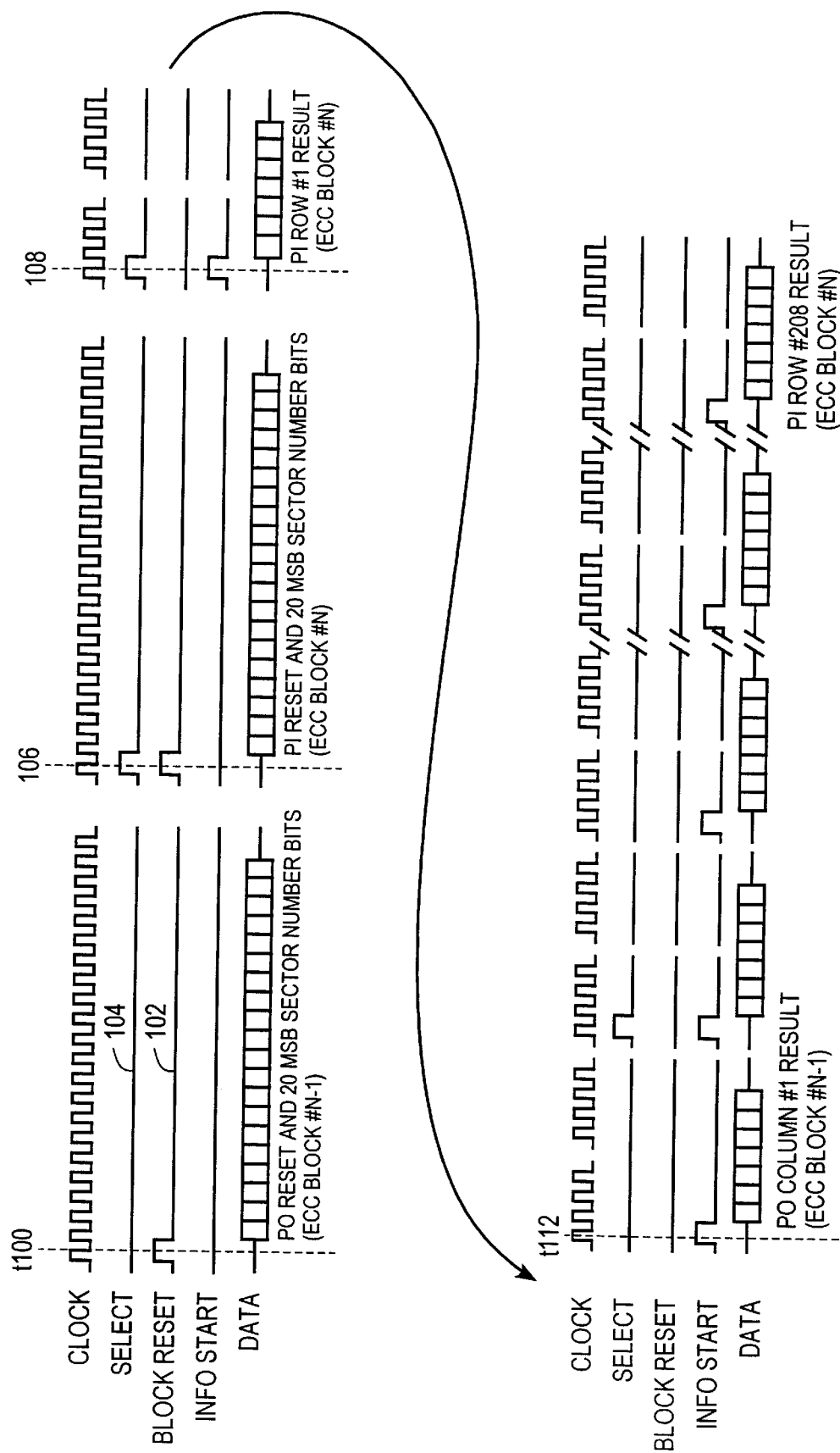

METHOD AND APPARATUS FOR DETECTING ERRORS IN DVD DATA

BACKGROUND OF THE INVENTION

1. Field of the Invention

The present invention relates to electronic systems employing DVD readers. More particularly, the present invention relates to a method and apparatus for presenting DVD media read error data.

2. The Background Art

Modern electronic systems such as video playback machines and computers often employ Compact Disc Read-Only Memory (CD-ROM) or DVD for storing large amounts of data such as video or audio data. DVDs are a type of storage media utilized for video and audio data as well as large software systems. Like CD-ROM media, a DVD media is read using a player or reader designed for that purpose. Information is stored on DVD media in digital form, resulting in data that is either a one (1) or a zero (0). Those of ordinary skill in the art are readily aware that DVD media contain areas of high reflectivity (land) and low reflectivity (pit). When read with a laser, a transition from land to pit or from pit to land represents a "1", and all other areas represent a "0".

During the process of writing data to a DVD media, Reed-Solomon error correction codes and other error mechanisms known to those of ordinary skill in the art are also written. When the data are later read back, these correction codes may be compared with actual correction codes which are computed from the actual data read from the DVD to determine whether one or more errors have occurred. Depending on the differences between the correction codes read from the DVD media and the correction codes computed from the actual data, errors in the actual data may be correctable.

In this disclosure, the term "correction code" shall refer to Reed-Solomon correction codes, checksums in general, and any other data structure used by those of ordinary skill in the art to determine if data has been accurately read from a storage media.

Those of ordinary skill in the art are well aware of methods and apparatus for determining whether the data is correctable, and for correcting the actual data. However, the prior art apparatus and methods suffer from unnecessary delays in allowing later processes to utilize information about errors, whether those errors were correctable, and how many errors were corrected.

FIG. 1 is a block diagram of a typical prior art DVD signal processing system, including a processing system 10 comprises a signal processor 12 which receives data 14 from a DVD media. Processor 12 examines the input data block and determines whether there are errors. If so, processor 12 corrects those errors that are correctable, and then stores the corrected data in memory 16.

FIG. 2 illustrates a typical arrangement of a typical data block after being processed by a DVD signal processor. A typical data block 14 (from FIG. 1) includes 208 rows (e.g., rows 20, 22) of 182 bytes each. Reading the block from left to right and from top to bottom in sections, each section includes 12 rows of data bytes, with each row including 172 actual data bytes plus 10 bytes of correction data information, the correction data relating to the preceding 172 actual data bytes. The correction data at the end of each row are known to those of ordinary skill in the art as inner code parity (PI) data. Every thirteenth row in a section includes error data 22 that are commonly called outer code parity (PO) data. Although the correction data are interleaved with actual data, PO data are processed as columns. A data block includes 172 user data bytes and 10 PI error data bytes per row, and includes 182 columns, each column having 192 user data bytes and 16 error data bytes. Additionally, every thirteenth row of data, beginning with the first row, includes a three-byte sector number that identifies the sector number of the data stored therein. Such a sector number is stored in rows 1, 14, 27, 40, etc., as shown in FIG. 2. There are 16 sector numbers within each ECC block. Therefore, a block number is specified by the most significant 20 bits of a 24-bit sector number (the sector number divided by 16), and may be represented as five hexadecimal digits.

The prior art apparatus is useful for its intended purpose of handling and managing PI and PO data and the error rate data produced by signal processor 12. However, there are significant delays which are inherent in the prior art apparatus due to the necessity of storing the data in memory prior to operating on the corrected data. Further, there is no defined method for providing the error rate data using an efficient data structure for later processing.

It would therefore be beneficial to provide an apparatus for handling and managing error rate information which allows devices needing error data to receive that data in real time.

It would also be beneficial to provide an apparatus which provides DVD error data to devices in a well-defined structure which can be processed efficiently and effectively.

It would also be beneficial to provide an apparatus which provides error information with the corresponding block number so that the data errors and block location may be correlated.

SUMMARY OF THE INVENTION

A method and apparatus for processing data read from a DVD medium is described. The apparatus includes a DVD media reader for reading data and error information stored on a DVD media, an error processor for determining the number of errors (if correctable) in the read data, and a display means for displaying the number of correctable errors. The method includes the steps of reading actual data from a DVD media, computing a first correction code for the actual data, reading a second correction code from the DVD media, and comparing the first and second correction codes to determine whether the actual data need to be corrected. The method further includes the steps of determining whether the maximum number of errors in the actual data exceeds the number of errors that can be corrected, correcting the actual data if possible, counting and displaying the number of errors that are corrected, and indicating that the data are uncorrectable if the number of errors exceeds the maximum number (10 errors for a row error, 16 errors for a column error).

BRIEF DESCRIPTION OF THE DRAWINGS

FIGS. 4A and 4B show data structures employed with two embodiments of the invention.

FIGS. 5A and 5B are schematic diagrams of signal combinations required to provide various error data for the data structures of FIGS. 4A and 4B, respectively.

DESCRIPTION OF THE BEST MODES

Those of ordinary skill in the art will realize that the following description of the present invention is illustrative only and is not intended to limit the scope of the invention. Other embodiments of the invention will readily suggest themselves to such skilled persons.

Figure 1:
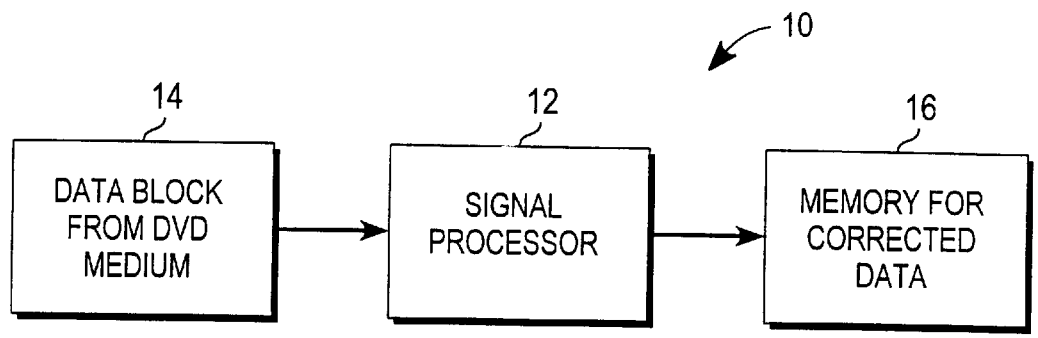
FIG. 1 is a block diagram of a typical prior art DVD signal processing system.
Figure 3:
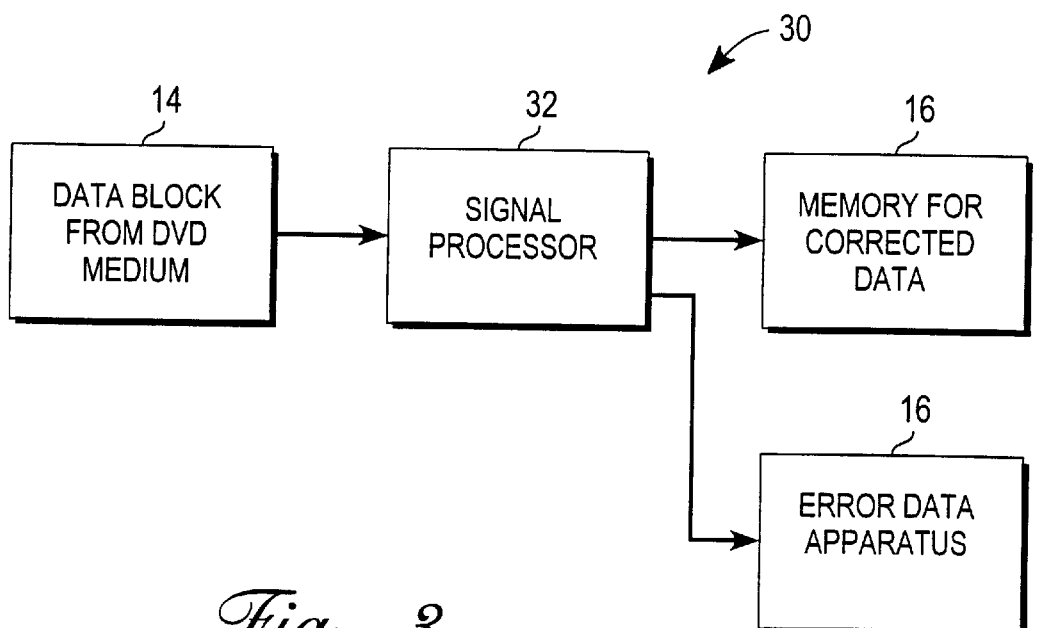
FIG. 3 is a block diagram of a system employing one embodiment of the invention.

FIG. 3 is a block diagram of a system 30 for practicing an embodiment of the invention. The system 30 includes a processor 32 having data block 14 (as first seen in FIG. 1) as an input signal, and corrected data memory 16 as an output signal. However, unlike the prior art, where the corrected data, PI data, and PO data are transmitted only to memory 16, an error rate apparatus 34 also receives error rate data over input lines 36. The output of error rate apparatus 34 is provided on one or more output lines 38. The signals on input lines 36 and output lines 38 each include a bus, with each bus having one or more signal lines. are processes that are known to those of ordinary skill in the art. However, the processor 32 additionally tracks the number of errors corrected in each row (PI data set) or column (PO data set), indicates which rows and columns, if any, are uncorrectable, and presents the number of row and column corrections, together with other information, to an output data stream.

Processing of PI data for any given data block is completed, after which PO data processing takes place for that block. Many data blocks are processed in any given session. While the error rate apparatus 34 processes PO data for a given block, the error rate apparatus processes PI data for the succeeding block at approximately the same time, in order to maximize data throughput.

FIG. 4A shows a data structure 50A (Data) produced in one embodiment of the invention. After all correctable data for all rows and columns in an ECC lock are corrected, the processor 32 (FIG. 3) will provide the data structure 50A, which includes 3+K bits in this embodiment. Bits 0–K (K≧1, preferably K=4) are a binary representation of the number of correctable errors in a given row (maximum of 10) or column (maximum of 16), with bit 0 being the LSB and bit 4 being the MSB. Bit 5 is a flag indicating that the row or column is uncorrectable, and bit 6 is reserved. The data structure Data has 380 error correction values for each ECC block (208 row values and 172 column values).

FIG. 4B shows a data structure 50B (Data) produced with one embodiment of the invention. After all correctable data for a given row or column are corrected (depending on whether PI or PO data are currently being processed), the processor 32 (FIG. 3) will provide the data structure 50, which includes 27 bits in this embodiment. Bits 0–19 represent the block ID no., with bit 0 being the LSB and bit 19 being the MSB. At least two bits 20, 21, 22, 23 and 24 are the binary representation of the number of correctable errors in a row or a column, with LSB first. Bit 25 is a flag indicating that the row or column is uncorrectable, and bit 26 is reserved. The reserved bit (no. 6 in FIG. 4A and no. 26 in FIG. 4B) may, for example, be used as a flag indicating that a sync pattern used to synchronize timing for the data stream has been lost, or may be used for other purposes. The data structure Data has 380 error correction values for each ECC block (208 row values and 172 column values). (FIG. 3) will provide the data structure 50, which includes 27 bits in this embodiment. Bits 0–19 represent the block ID no., with bit 0 being the LSB and bit 19 being the MSB. Bits 20, 21, 22, 23 and 24 are the binary representation of the number of correctable errors in a row or a column, with LSB first. Bit 25 is a flag indicating that the row or column is uncorrectable, and bit 26 is reserved. The reserved bit (no. 6 in FIG. 4A and no. 26 in FIG. 4B) may, for example, be used as a flag indicating that a sync pattern used to synchronize timing for the data stream has been lost, or may be used for other purposes. The data structure Data has 380 error correction values for each ECC block (208 row values and 172 column values).

The digital signal processor 32 in FIG. 3 has an external five-signal interface that can be used for monitoring the results of the PI and PO error correction process for DVD. Correction results are available for each data row (PI correction) and for each data column (PO correction).

Figure 5B:
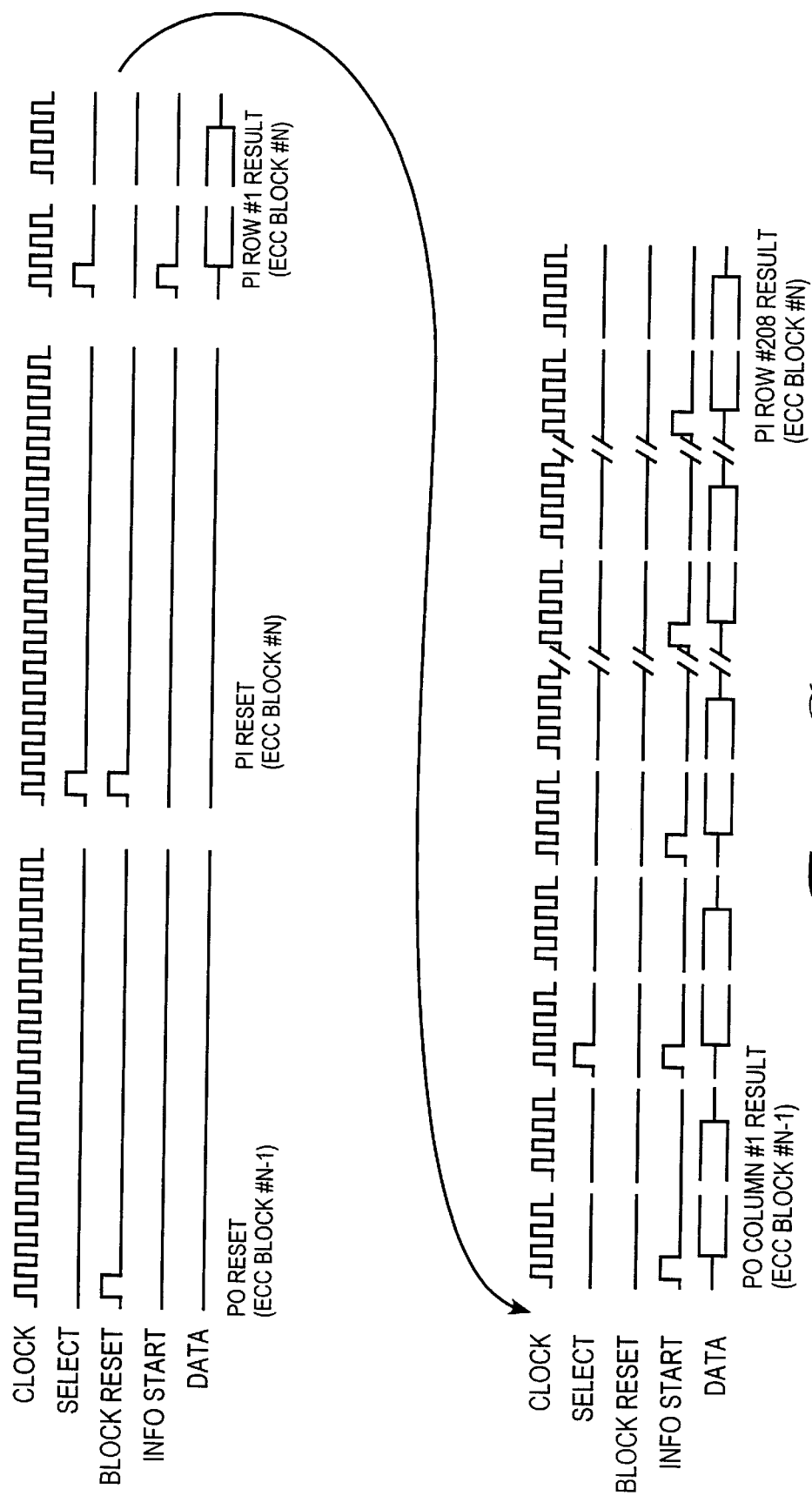

FIGS. 5A and 5B illustrate the signal requirements for readout of certain error data associated with an ECC block for the data structures in FIGS. 4A and 4B, respectively. The signal C33M is an internal DVD clock signal generated within the signal processor 32. The C33M signal can have any frequency, but is no more than 40 MHz or is a sub-multiple of an internal ASIC clock in a preferred embodiment. The falling edge of the C33M signal drives external clocking. The Block_Reset signal indicates that the beginning of an ECC block has been detected and that a PI or PO correction operation is beginning. The Info_Start signal indicates that a data value will appear on the Data terminal, beginning with the next clock signal. The Data signal is a serial data output signal, illustrated in two embodiments in FIGS. 4A and 4B. The first Data signal transmitted after the Block_Reset signal is asserted is the error information for the first row (Select=1) or for the first column (Select=0). Error information for all 208 rows or for the first 172 columns will be issued; error information for the last 10 columns in an ECC block is not issued. The system has a pipelined architecture, with PO and PI corrections being computed at substantially the same time. The PI error values for block N are interleaved with the PO error values for block N−1, where two or more ECC blocks are read together.

The Select signal determines whether Block_Reset, Info_Start and Data apply to a PI correction result or apply to a PO correction result. The following signal combinations indicate that a PO reset, a PI reset or a PI row result is to be performed:

$$PO\ reset:\ (Select)^* \cdot (Block\_Reset) \cdot (Info\_Start)^* = 1, \quad (1)$$

$$PI\ reset:\ (Select) \cdot (Block\_Reset) \cdot (Info\_Start)^* = 1, \quad (2)$$

$$PI\ row\ result:\ (Select) \cdot (Block\_Reset)^* \cdot (Info\_Start) = 1. \quad (3)$$

The particular choices, high or low, for the Select, Block_Reset and Info_Start signals in (1)–(3) are arbitrary and may be changed, with corresponding changes being made in processing of any signal that depends upon one or more of such signals. In the embodiment associated with FIG. 5A, the ECC block number is issued at the start of each PI or PO reset operation; the data structure 50A does not include the ECC block number, with a binary representation of up to 20 bits. In the embodiment associated with FIG. 5B, the ECC block number is part of the data structure 50B (bits 0–9 in the particular version shown in FIG. 4B) and appears with error data on each row and column.

FIG. 5A is a signal transition chart showing the relationship of various signals on the output of the embodiment corresponding to the data structure 50A. The clock signal 98 is provided on clock line 90 in FIG. 6.

At a time t100, a Block_Reset signal 102 is pulsed high for one clock cycle, and Select signal 104 is set low, the signals together indicating that the next data information to be transferred is the block ID for the PO data to follow. Data are transmitted, one bit per clock cycle, on data lines 86, giving the receiving device the ID data.

At a time 106, a Block_Reset signal 102 is raised high, as is a Select signal 104, the signals together indicating that the next set of PI data will pertain to the block ID transferred immediately thereafter.

At a time 108, a Select signal 104 is raised high, as is an Info_Start signal 110, indicating that the transfer of a PI data structure will follow.

At a time t112, a Select signal 104 is set low, and Info_Start signal 110 is high, indicating that a transfer of a PO data structure will follow.

The transfer of data proceeds as outlined until all PO data for a given block, and the PI data for the succeeding block, have been transferred. Although all PI data are received sequentially, and all PO data are received sequentially, PI data and PO data may be mixed in any combination. For example, PI data corresponding to block number 0×35201H will be transmitted sequentially beginning at line 0 and ending at line 207, but that data may be intermixed with PO data from block number 0×35200H. The intermixed PO data is also transmitted sequentially beginning at column 0 for each line, and ending at column 181 for each line, moving to the next column, and so on.

Figure 6:
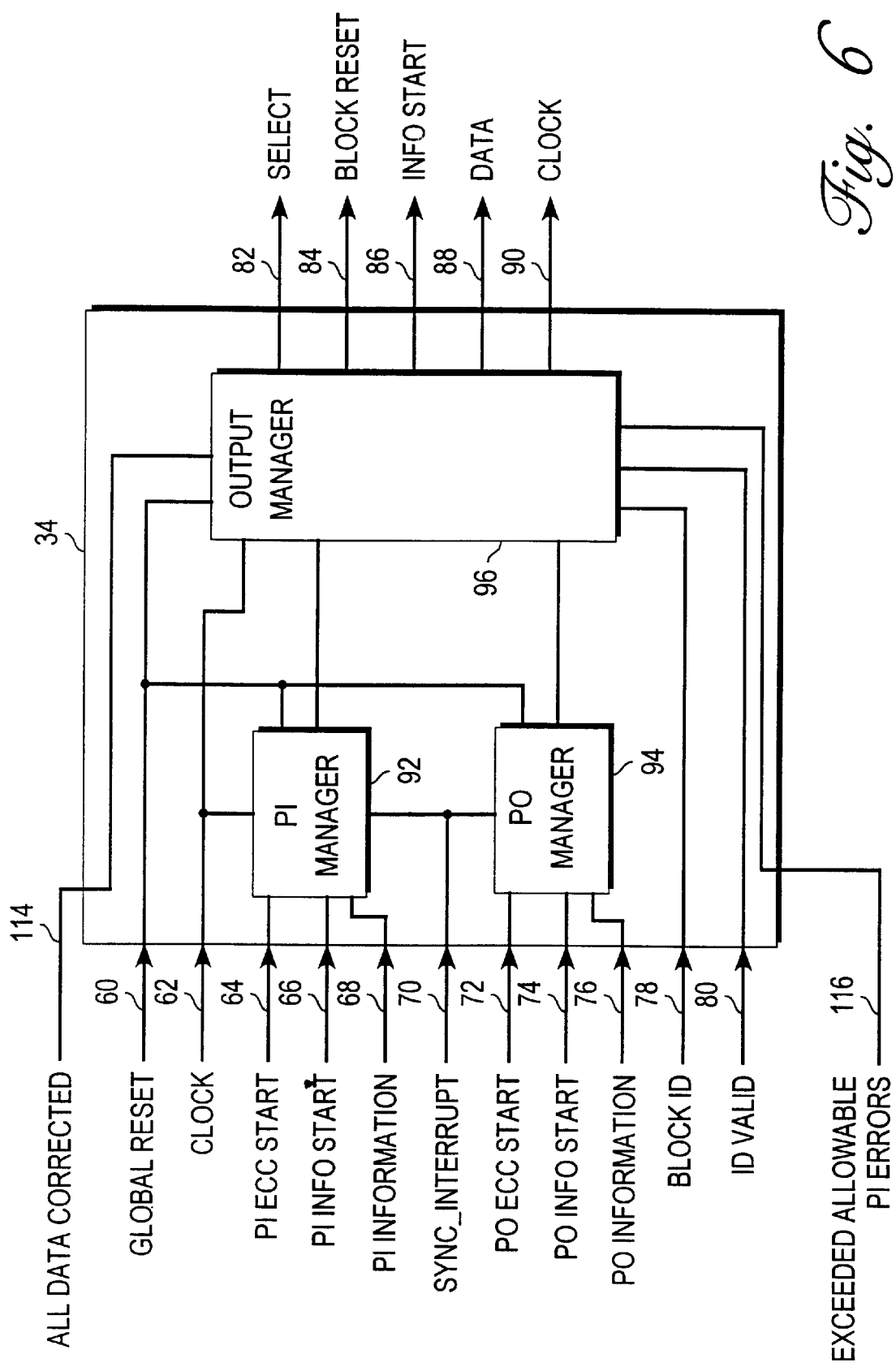
FIG. 6 is a block diagram of one embodiment of the present invention error rate apparatus.

FIG. 6 is a block diagram of one embodiment of the present invention error rate apparatus. Signals are characterized as being asserted and deasserted. Those of ordinary skill in the art would be readily aware that signals may be asserted high or asserted low depending on the needs of the designer of the system. Correspondingly, a signal may be de-asserted low or high, depending on the needs of the designer. Those of ordinary skill in the art will appreciate that systems employing either of the alternatives remain within the scope and purpose of the present invention.

Referring to FIG. 6, the error rate apparatus 34 of FIG. 3 is typically an application-specific integrated circuit (ASIC) having, as inputs from processor 32, a global reset line 60, clock 62, a PI ECC start line 64, a PI Info_Start line 66, PI information lines 68, sync interrupt line 70, a PO ECC start line 72, a PO Info_Start line 74, PO information lines 76, Block ID lines 78 and ID valid line 80. Output signals from error rate apparatus 34 appear on a select line 82, a block reset line 84, an info start line 86, a data line 38, and clock 90. The error rate apparatus 34 includes a PI manager 92, a PO manager 94 and an output manager 96 to manage the receipt of PI data, the receipt of PO data, and the timing of output signals, respectively.

Global reset line 60, is asserted by the signal processor 32 when the system first initializes, indicating to the error rate apparatus 34 that the processor 32 is ready to begin transmitting data. A clock signal is provided by a system clock on clock line 62 to synchronize data transfers between the signal processor 32 and the error rate apparatus 34.

Figure 2:
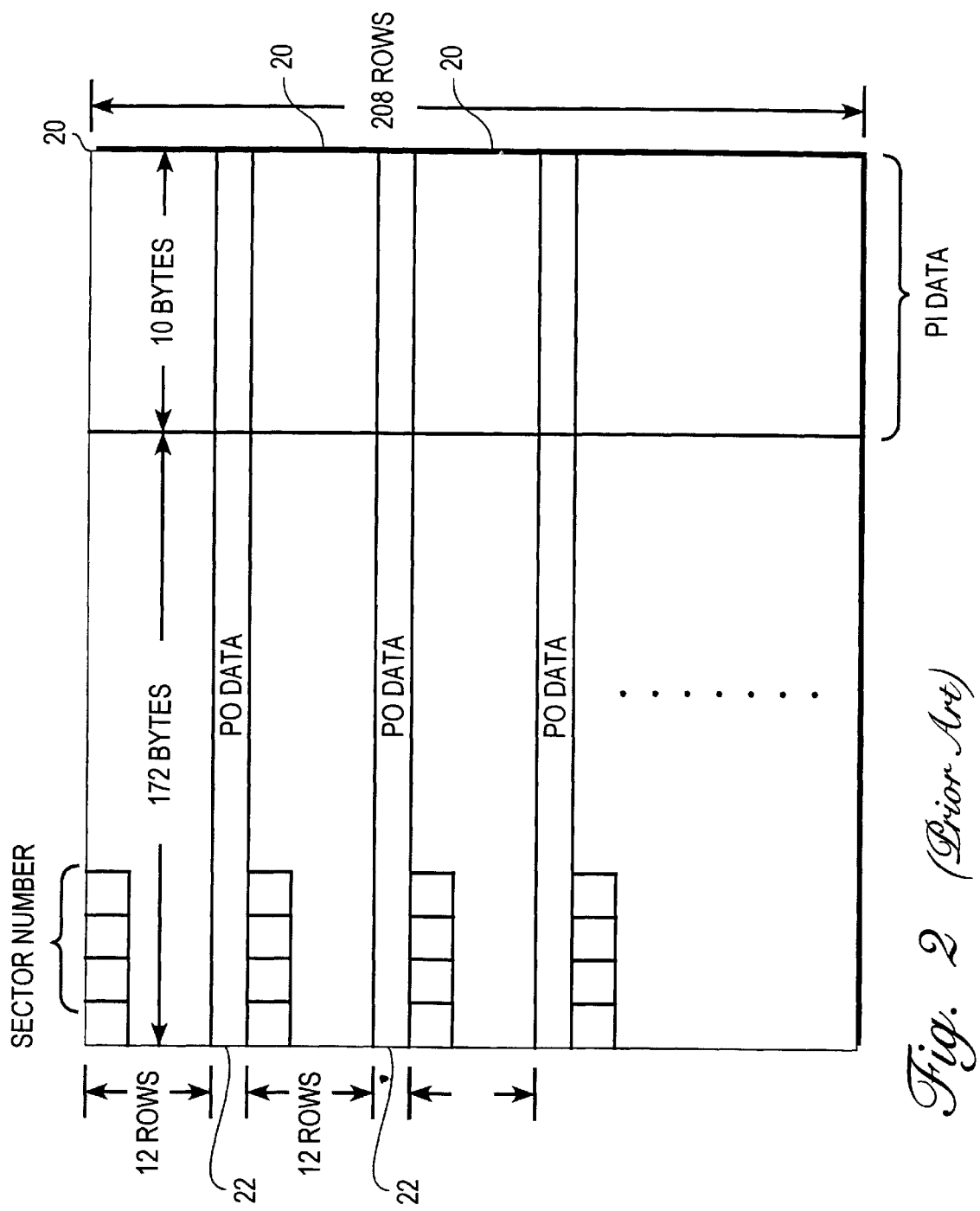
FIG. 2 depicts a typical prior art arrangement of a data block after being processed by a DVD signal processor.

A PI ECC start line 64 is asserted for one clock cycle each time processing for a new data block begins. For example, FIG. 2 represents a typical data block. Each time processing begins for a new data block such as the data block described with respect to FIG. 2, the PI ECC start line 64 is asserted for one clock cycle. A PI info start 66 is asserted for one clock cycle each time a new 7-bit or 27-bit PI data structure is transferred. A PI information lines 68 is asserted or deasserted as required to provide the data structures in FIGS. 4A and 4B, which indicates which data, if any, were corrected, how many errors existed, and whether a sync lost condition exists.

A sync interrupt line 70 is asserted by the signal processor 32 when a preset number of data elements has been received without detecting a sync pattern. The PO ECC start line 72, PO Info_Start line 74, and PO information lines 76 operate in the same manner as PI ECC start line 64, PI Info_Start line 66, and PI information lines 68, respectively, except that these lines operate on PO data, rather than on PI data.

Block ID lines 78 are utilized to transmit the block identifier of the ECC block to which the current data pertains. ID valid line 80 is asserted when the information presented by the processor to error rate apparatus 34 on block ID lines 78 is valid. Alternatively, PI Info_Start line 66 or PO Info_Start 74 may be used to trigger acceptance of the data present on the Block ID lines 78, and either of the PI information lines 68 or the PO information lines 76 respectively, depending on whether it is PI or PO data that are being operated upon at the time.

The select line 82 on the output of the error rate apparatus 34 is used to indicate the character of data on the output. For example, in one embodiment, if PI data are being transferred, the select line 82 asserted. In that same embodiment, if PO data are being transferred, the select line 82 will be deasserted. Those of ordinary skill in the art would readily recognize that signal lines may be asserted high or low, and that a signal may be asserted or deasserted to indicate a given condition while remaining within the scope and purpose of the present invention.

The block reset line 84 is asserted for one clock cycle when the first item of PI data corresponding to a data block is transmitted, and also when the first item of PO data corresponding to a data block is transmitted. Immediately thereafter, the block ID of the data block is transmitted by output manager 96 over data line 86.

The determination, by an external device, of whether the block reset signal and the block ID transmitted thereafter pertain to PI or PO data is made by examining the state of the select line 82 at the time the block reset line is asserted. In this example, if select line 82 is asserted at the time the block reset line is asserted, the block ID transmitted thereafter pertains to PI data. If the select line 82 is deasserted at the time the block reset line is asserted, the block ID transmitted thereafter pertains to PO data. The info start line 88 is asserted by the error rate apparatus 34 whenever a PI or PO data stream is to be transferred over data line 88 to an external device.

The clock line 90 is optionally provided at the output of the error rate apparatus 34 in order to synchronize the output data with a receiving device. Alternatively, a single clock signal may be provided so that all system components are synchronized.

Those of ordinary skill in the art would readily recognize that power and ground conductors (not shown) must also be provided to the system components in order for them to operate properly. These conductors are not shown, in order to avoid complicating this disclosure.

The previous example assumes that correctable errors were present following the correction of PI data and that PO error rate information follows. However, it is possible that all errors which were present during the analysis of PI data were corrected. In this instance, the signal processor 32 does not send PO correction data. However, any external device which receives data from error rate apparatus 34 needs PO data information. Therefore, the error rate apparatus 34 in FIG. 3 sends internally generated data that advises external devices that all of the PO data are correct and no further corrections are required.

Several methods exist for determining when all PI data are corrected. One approach is to track all PI data structures. If all PI data structures, as seen in FIGS. 4A and 4B, contain X0XXXXX$_2$, where each X indicates any bit value, all data have been corrected, and there are no further corrections to be made. Thus, no PO error information need be transmitted. A second method involves a signal sent from the signal processor 12 to the error rate apparatus 34 on an optional signal line 114. Those of ordinary skill in the art will appreciate that many other methods for signaling to error rate apparatus 34 that all data has been corrected, without departing from the scope or purpose of the present invention.

An condition may exist where there are so many errors that all of the data for a given ECC block is uncorrectable. In this case, PO data need not be examined, if the determination of uncorrectability was made while PI data for that block was being examined. According to one DVD specification, more than sixteen instances of a row of data having more than five errors in a given sector means that the PO data correction is not possible. If the signal processor 12 determines that more than the acceptable numbers of errors exist during PI correction, it may signal, by asserting an optional signal line 116 (in FIG. 5), that error rate apparatus 34 needs to generate internally generated PO error codes. These PO error codes would include X110000$_2$, indicating that the column data is uncorrectable, but that the actual number of errors is unknown.

Figure 7:
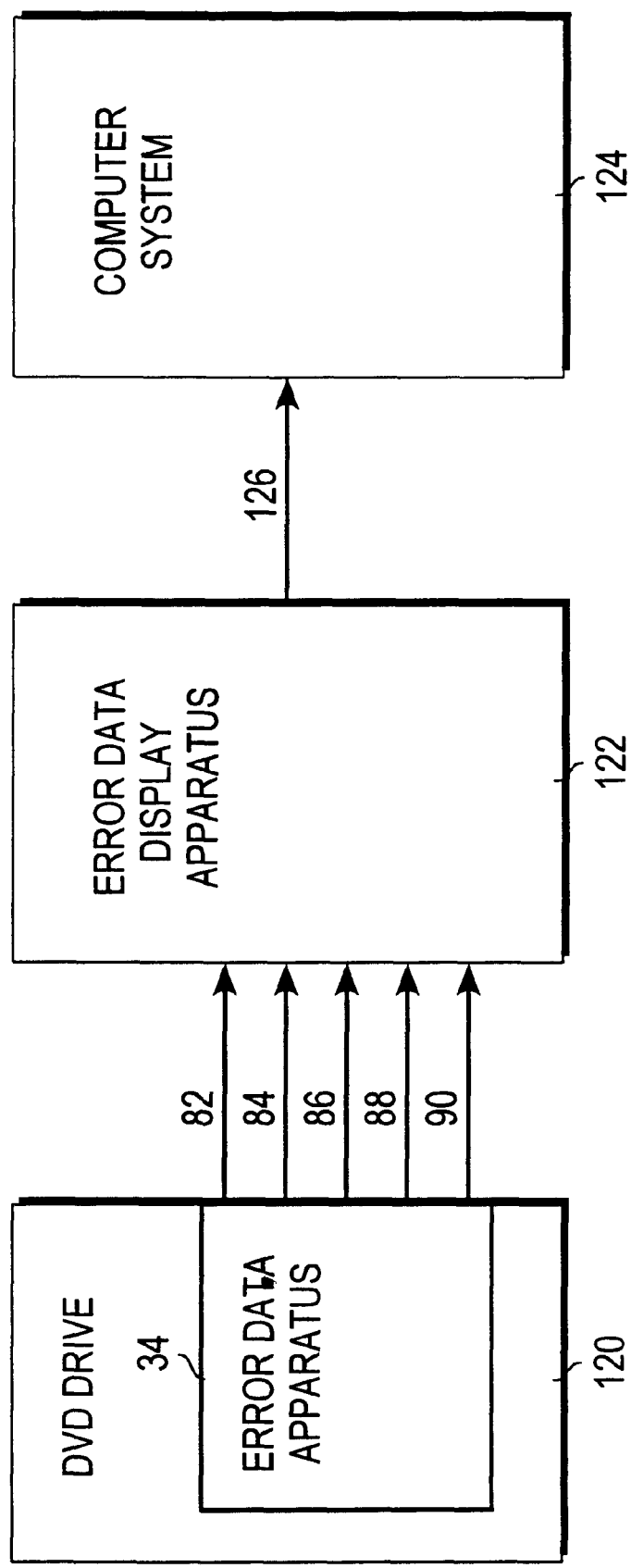
FIG. 7 is a block diagram of an electronic system employing the invention error rate apparatus.

Those of ordinary skill in the art will readily recognize that there may be one or more clock cycles where no data are transferred, or there may instead be no "idle" clock cycles, depending on the timing of the arrival of data at the input terminal(s) of error rate apparatus 34. FIG. 7 is a block diagram of an electronic system employing the present invention error rate apparatus, including a DVD drive 120, a display apparatus 122, and optional computer system 124. The DVD drive 120 includes the error rate apparatus 34 of FIG. 3. The computer system 124 may or may not be required, depending on the specific analysis desired by a designer and user of the system. Those of ordinary skill in the art would readily recognize that signal lines 126 may be designed to accommodate any known computer communications protocols, such as RS-232.

Figure 8:
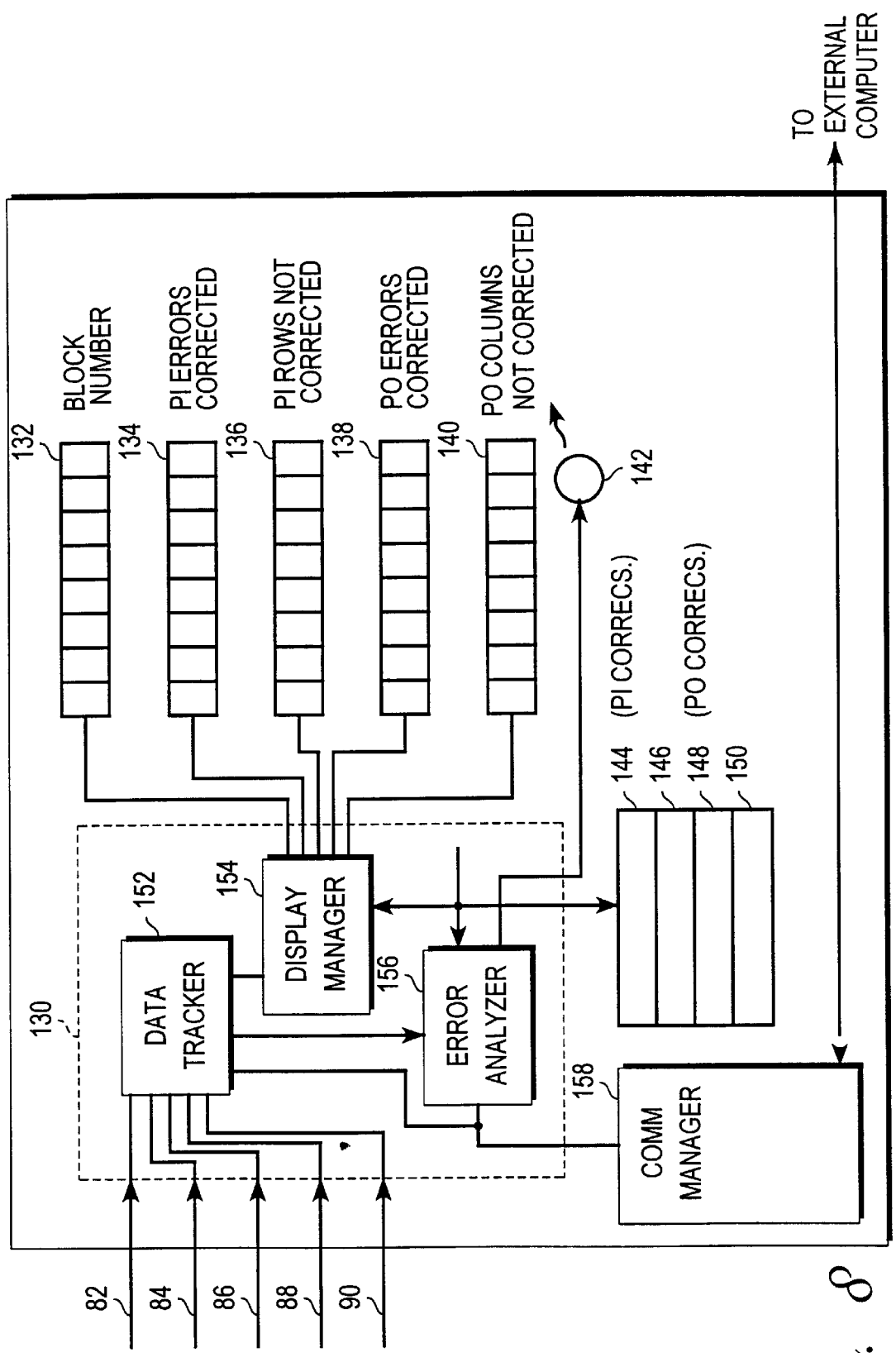
FIG. 8 is a block diagram showing details of the error-rate display apparatus.

FIG. 8 is a block diagram showing more details of the error-rate display apparatus of FIG. 3. Display apparatus 112 includes data processing apparatus 130, displays 132, 134, 136, 138, and 140, LED 142, and registers 144, 146, 148, and 150. The registers 144, 146, 148, and 150 are provided so that the number of errors and uncorrected rows and columns may be tracked for each group of ECC blocks. In this embodiment, the register 144 and the display 134 each relate to the number of PI errors corrected for a given group. Correspondingly, the register 146 and the display 136 relate to the number of PI rows which were uncorrectable; the register 148 and the display 138 relate to the number of PO errors corrected; and the register 150 and the display 140 relate to the number of PO columns having uncorrectable data.

The display apparatus 122 is utilized so that a human user of the system may be aware of the reliability of data being received from DVD drive 112. The speed of DVD drives is generally related to a standard speed known to those of ordinary skill in the art. Therefore, a 1× drive is receiving and processing data at the standard speed, and a 4× drive receives and processes data at four times the standard speed. At the standard speed, a typical ECC block will be read and processed every 23.7 msec. If the data corresponding to individual blocks were displayed, the displays would change too rapidly for a user to make any meaningful use of the data. Therefore, display apparatus 130 tracks error data for groups of ECC blocks. Such groups may be 50, 10, 200, or 400 blocks in size, or may be other sizes, depending on individual needs. In the example which follows, it is assumed that the size of block groups being processed and displayed is 100 blocks.

The data processing apparatus 130 includes data tracker 152, display manager 154, and error analyzer 156. When a Block_Reset occurs as illustrated in FIGS. 5A and/or 5B, the data tracker 152 determines if the current block is the first block in a new group (e.g., of 100 blocks). If so, the block number displayed by the display 132 is updated to reflect the most significant digits of the first block of the current group of 100 blocks. The display 132 may present numerical information in any format desired by the user, such as hexadecimal, binary, or decimal. However, the preferred industry format for discussing and presenting block numbers is hexadecimal.

If the display 132 is designed to provide information in the industry-preferred hexadecimal format, a "0" may be hard coded to be displayed as the least significant digit, if the user desires that the sector number of the first block be displayed, rather than the block number. The 20-bit block number transmitted following a block reset signal is displayed as the five most significant hexadecimal digits of the sector number. If the current block is the first block in a group, registers 144, 146, 148, and 150 are initialized to zero, and the respective ones of displays 134, 136, 138, and 140 are updated by display manager 146.

As PI and PO data are received from the error rate apparatus 34 by the data tracker 152, the character of the data is determined by the error analyzer 156 as discussed in connection with FIG. 8, and the proper register is updated. For example, if the incoming data reflects PO information indicating that a given number of errors were correctable, and therefore corrected, error analyzer would retrieve the current value of the register 148, increment that value by "1", and restore that new value in the register 148. The display manager 146 would then display the new value on display 138.

In a like manner, if the incoming data contain a PI information indicating that a given number of errors were correctable, and therefore corrected, that number is added, using the error analyzer 156, to the current value of the register 144, and subsequently displayed on the display 134. The registers 146 and 150, together with the displays 136 and 140, relate to the number of PI rows and the number of PO rows having uncorrectable errors respectively.

An optional communications manager 158 is provided in order to interface the data processing apparatus 130 to an external computer or other microprocessor-based device for more detailed analysis of error data, if desired. For example, a manufacturer may wish to know the error content of data stored on a particular area of a DVD media. Employing an external computer would allow that manufacturer to store error data specific to that region of the medium, and display the associated error information on a row, column, sector, or block level.

Alternative embodiments of the display apparatus 122 include a switching means which would allow an operator of the system to select, using software or hardware, a custom number of blocks to include in a group. While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. An apparatus for analyzing errors within data read from a DVD media, the apparatus comprising:
    a DVD media reader for reading data and error information stored on a DVD media;
    an error processor for determining number of PI errors and number of PO errors in said read data; and
    a display means for displaying at least one of:
       number of uncorrectable PI rows in said read data;
       number of uncorrectable PO columns in said read data;
       number of correctable PI rows in said read data; and
       number of correctable PO columns in said read data.

2. The apparatus of claim 1, wherein said DVD media reader includes means for reading a sector number from which said read data originated.

3. The apparatus of claim 1, wherein said display means includes a first display for displaying the number of uncorrectable PI rows in said read data second display for displaying the number of uncorrectable PO columns in said read data, a third display for displaying the number of correctable PI rows in said read data, and a fourth display for displaying the number of correctable PO columns in said read data.

4. An apparatus for analyzing errors within a bitstream, the apparatus comprising:
    circuitry for reading data and error information;
    an error processor for determining number of PI errors and number of PO errors in said read data;
    circuitry for computing a first correction code for said read data;
    circuitry for comparing said first correction code to a second correction code that is provided for comparison;
    a circuit for comparing errors in the data in order to determine whether a number of errors in said read data exceeds the number of errors that can be corrected; and
    at least one display means for displaying at least one of the following:
       number of uncorrectable PI rows in said read data;
       number of uncorrectable PO columns in said read data;
       number of correctable PI rows in said read data; and
       number of correctable PO columns in said read data.

5. The apparatus of claim 4, wherein said DVD media reader includes means for reading a sector number from which said read data originated.

6. The apparatus of claim 4, wherein said display means includes:
    a first display for displaying the number of uncorrectable PI rows in said read data;
    a second display for displaying the number of uncorrectable PO columns in said read data;
    a third display for displaying the number of correctable PI rows in said read data; and
    a fourth display for displaying the number of correctable PO columns in said read data.

7. A system for analyzing errors within data read from DVD media, the system comprising:
    a DVD medium reader that reads at least one block of data stored on a DVD medium;
    an error processor that receives the at least one block of data from the DVD reader and determines at least one of: number of PI errors in at least one row of the data block read and number of PO errors in at least one column of the data block read; and
    a visually perceptible display for identifying the block of data read and for displaying at least one of the following: whether the PI errors in the at least one row are uncorrectable, number of corrected PI errors in the at least one row when the PI errors are correctable, whether the PO errors in the at least one column are uncorrectable, and number of corrected PO errors in the at least one column when the PO errors are correctable.

8. The system of claim 7, wherein at least one of said DVD reader and said error processor provides an information segment including at least one of: an identifier for said data block read; an identifier for said at least one row; whether at least one error in the identified row is uncorrectable; and when all errors in the identified row are correctable, said number of PI errors corrected within the identified row.

9. The system of claim 8, wherein at least one of said DVD reader and said error processor provides said information segment including at least one bit indicating whether a sync pattern for said data block read has been lost.

10. The system of claim 7, wherein at least one of said DVD reader and said error processor provides an information segment including at least one of: an identifier for said data block read; an identifier for said at least one column; whether at least one error in the identified row is uncorrectable; and when all errors in the identified row are correctable, said number of PI errors corrected within the identified row.

11. The system of claim 10, wherein at least one of said DVD reader and said error processor provides said information segment including at least one bit indicating whether a sync pattern for said data block read has been lost.

12. The system of claim 7, wherein said visually perceptible display includes at least four bits, including at least one of: at least one bit indicating whether data in said at least one row is uncorrectable, and at least two bits indicating the number of data corrections to be made in said at least one row, when said at least one row is correctable.

13. The system of claim 12, wherein said visually perceptible display includes at least 24 bits.

14. The system of claim 7, wherein said visually perceptible display includes at least four bits, including at least one of: at least one bit indicating whether data in said at least one column is uncorrectable, and at least two bits indicating the number of data corrections to be made in said at least one column, when said at least one column is correctable.

15. The system of claim 14, wherein said visually perceptible display includes at least 24 bits.

16. A method for analyzing errors within data read from DVD media, the method comprising:
    reading at least one block of data stored on a DVD medium;
    determining at least one of: number of PI errors in at least one row of the data block read and number of PO errors in at least one column of the data block read;
    identifying the data block read; and
    identifying the block of data read and displaying at least one of the following: whether the PI errors in the at least one row are uncorrectable, number of corrected PI errors in the at least one row when the PI errors are correctable, whether the PO errors in the at least one column are uncorrectable, and number of corrected PO errors in the at least one column when the PO errors are correctable.

17. The method of claim 16, further comprising providing an information segment including at least one of: an identifier for said data block read; an identifier for said at least one row; whether at least one error in the identified row is uncorrectable; and when all errors in the identified row are correctable, said number of PI errors corrected within the identified row.

18. The method of claim 17, further comprising including in said information segment at least one bit indicating whether a sync pattern for said data block read has been lost.

19. The method of claim 16, further comprising providing an information segment including at least one of: an identifier for said data block read; an identifier for said at least one column; whether at least one error in the identified column is uncorrectable; and when all errors in the identified column are correctable, said number of PI errors corrected within the identified column.

20. The method of claim 19, further comprising including in said information segment at least one bit indicating whether a sync pattern for said data block read has been lost.

21. The method of claim 16, further comprising choosing said visually perceptible display to include at least four bits, including at least one of: at least one bit indicating whether data in said at least one row is uncorrectable, and at least two bits indicating the number of data corrections to be made in said at least one row, when said at least one row is correctable.

22. The method of claim 21, further comprising choosing said visually perceptible display to include at least 24 bits.

23. The method of claim 16, further comprising choosing said visually perceptible display to include at least four bits, including at least one of: at least one bit indicating whether data in said at least one column is uncorrectable, and at least two bits indicating the number of data corrections to be made in said at least one column, when said at least one column is correctable.

24. The method of claim 23, further comprising choosing said visually perceptible display to include at least 24 bits.

* * * * *